US006171439B1

(12) United States Patent
Groeneweg

(10) Patent No.: US 6,171,439 B1
(45) Date of Patent: Jan. 9, 2001

(54) MANUAL STAMP DISPENSER

(76) Inventor: Glen Groeneweg, 1252 Laurie Gail Dr., Lowell, MI (US) 49331

(*) Notice: Under 35 U.S.C. 154(b), the term of this patent shall be extended for 0 days.

(21) Appl. No.: 09/173,410

(22) Filed: Oct. 15, 1998

(51) Int. Cl.[7] .......... B32B 35/00
(52) U.S. Cl. .......... 156/584; 156/344; 221/73
(58) Field of Search .......... 156/344, 584; 221/73

(56) References Cited

U.S. PATENT DOCUMENTS

| | | | | |
|---|---|---|---|---|
| 2,276,297 | | 3/1942 | Flood . | |
| 2,341,368 | | 2/1944 | Flood . | |
| 2,394,991 | | 2/1946 | Flood . | |
| 2,754,994 | * | 7/1956 | Cole | 221/73 |
| 2,838,171 | | 6/1958 | Kaspar . | |
| 2,912,140 | | 11/1959 | Cole . | |
| 3,066,881 | | 12/1962 | Krueger . | |
| 3,077,919 | | 2/1963 | Krueger . | |
| 3,128,012 | | 4/1964 | Berg . | |
| 3,169,895 | * | 2/1965 | Sohn | 221/73 |
| 3,231,130 | | 1/1966 | Foote . | |
| 3,308,002 | | 3/1967 | Hurwich et al. . | |
| 3,388,380 | * | 6/1968 | Short | 156/361 |
| 3,821,057 | * | 6/1974 | Grasmann | 156/384 |
| 4,059,203 | | 11/1977 | Wright . | |
| 4,097,328 | | 6/1978 | Urushizaki . | |
| 4,182,645 | * | 1/1980 | Hill | 156/584 X |
| 4,194,646 | | 3/1980 | Oglander et al. . | |
| 4,264,396 | | 4/1981 | Stewart . | |
| 4,497,420 | | 2/1985 | Stelcher et al. . | |
| 4,570,868 | | 2/1986 | Wiggs et al. . | |
| 4,576,311 | | 3/1986 | Horton et al. . | |
| 4,954,210 | | 9/1990 | Desmond . | |
| 5,261,563 | | 11/1993 | Brimhall . | |
| 5,770,008 | | 6/1998 | Murphy . | |
| 5,851,347 | * | 12/1998 | Rodriquez | 156/576 |
| 5,938,070 | * | 8/1999 | Welborn et al. | 221/73 |

* cited by examiner

*Primary Examiner*—Mark A. Osele
(74) *Attorney, Agent, or Firm*—Van Dyke, Gardner, Linn & Burkhart, LLP

(57) ABSTRACT

A manual stamp dispenser encases a roll of stamps or labels within a housing and provides tension to the roll as the stamps are advanced and discharged therefrom. The stamps are adhered to a backing strip by a pressure sensitive adhesive such that the stamps are released from the backing strip by reverse bending the strip around a dispensing surface. Tension is provided to the stamp strip by a tensioning tab on a supply roll holder and a tensioning arm positioned along a guide surface between the supply roll holder and the dispensing surface.

12 Claims, 3 Drawing Sheets

MANUAL STAMP DISPENSER

BACKGROUND OF THE INVENTION

This invention relates to stamp or label dispensers, and more particularly to dispensers for dispensing stamps, labels or the like that are removably secured to a backing strip.

Historically, stamps or labels have had adhesive backing which required moisture to be applied thereto prior to applying the stamp or label to an envelope or the like. These stamps were typically supplied in rolls, where a single stamp was torn from the roll, moistened, and then applied to the desired surface. Several dispensers have been commercially produced which allow for dispensing of a single stamp or label at a time, while the remaining portion of the roll remains within the dispenser. More recently, however, self-adhesive stamps and labels are provided on a backing strip which allows a stamp or label to be peeled off from the backing strip for direct application onto an envelope without the need for applying moisture.

In order to dispense stamps from a backing strip, the strip of stamps may be pulled over a surface or edge that substantially changes the direction of travel of the stamp strip. By pulling the backing strip along a sharp bend, the pressure sensitive adhesive that adheres the stamps to the backing strip releases the stamp, which allows the stamp to be discharged in the initial direction of travel while the backing strip is pulled in another direction.

To date, several dispensers for dispensing labels that are attached to a backing strip have been proposed. Many of the proposed designs include a housing in which is placed a roll of labels. The roll is unwound as the backing strip is pulled out of an opening in the housing. The backing strip is often pulled through a sharp turn at an exterior location of the housing such that each label becomes detached from the backing strip, as the labels do not bend around the turn with the backing strip. While such a dispenser may dispense the labels separate from the backing strip, the backing strip is often simply pulled outward from the housing, and has to be separately torn and thrown away after a substantial amount has been pulled from the housing.

Other dispensers have been proposed that include an internal take up spool upon which is wound the backing strip after the label has been discharged from the dispenser. These proposed dispensers typically include a supply roll holder and a take up spool, where the labels and backing strip are guided along a path to a sharp bend in the path where the labels are discharged from the backing strip. However, many of the designs fail to provide tension to the strip of stamps, which results in slack in the stamp strip. Slack in the strip leads to difficulty in discharging the label from the backing strip as the stamp or label then may have enough slack to bend along with the backing strip around the sharp bend in the path.

In order to reduce the slack encountered by the stamp strip, other proposed devices implement additional rollers which allow the stamp strip to roll therebetween. While such a design may reduce slack in the dispenser, it is typically a costly device as there are additional moving parts that must be adjusted properly so as to avoid over and under tensioning of the stamp strip.

Consequently, there is a need for a stamp dispenser for dispensing stamps from a backing strip, which provides for an internal take up roll for the backing strip to allow for easy disposal of the backing strip only when the supply roll of stamps is replaced in the dispenser. Furthermore, there is a need for a dispenser to provide an appropriate amount of tension to the strip of stamps or labels so that the last stamp on the strip is discharged as easily as the first stamp, while avoiding additional moving parts.

SUMMARY OF THE INVENTION

Accordingly, the present invention provides a manual stamp dispenser for dispensing labels or stamps that are secured to a backing strip, and further provides tension to the strip of labels throughout the entire supply roll, including the last stamp removed from the strip.

According to a first aspect of the present invention, a stamp dispenser is adapted for dispensing stamps that are adhered to a backing strip. The stamp dispenser comprises a supply holder, a dispensing surface, a guide surface, a tensioning arm and a take up spool. The supply holder holds a supply of stamps therein and has an opening through which the strip of stamps is advanced. The guide surface guides the stamps from the supply holder to the dispensing surface, which provides an edge for releasing the stamps from the backing strip. The tensioning arm is positioned between the guide surface and dispensing surface and contacts a surface of the stamp strip as the stamp strip is advanced. The stamp strip is thus diverted from a height corresponding to the guide surface thereby providing resistance to advancement of the stamp strip to reduce slack in the stamp strip. The supply holder, guide surface, and take up spool may all be encased within a housing assembly.

According to another aspect of the present invention, the stamp dispenser includes a tensioning tab on the supply roll holder, which extends partially across the opening in the supply holder, and contacts a surface of the stamp strip as it is pulled therefrom. The tensioning tab provides resistance to movement of the stamp strip so as to avoid slack in the strip of stamps as the supply roll is unrolled.

As will be understood, the dispenser of the present invention provides several advantages over the prior art. The dispenser allows the backing strip to be collected on a single spool within the housing for easy disposal when the supply roll is replaced. Furthermore, the dispenser provides at least one tensioning device, which provides tension in the strip of stamps throughout the entire roll of stamps. Each of the tensioning devices of the present invention improve upon the performance of the stamp dispenser without the necessity of additional rollers or other moving parts that are present in the prior art.

These and other objects, advantages, purposes and features of the invention, will become more apparent from the study of the following description taken in conjunction with the drawings.

DESCRIPTION OF THE PREFERRED EMBODIMENTS

Figure 1:
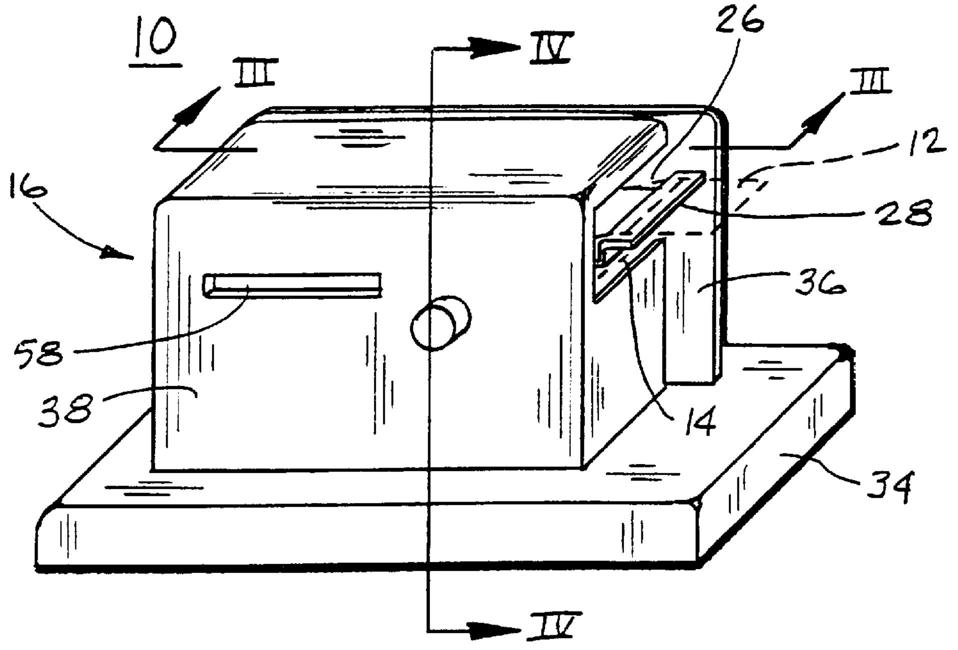
FIG. 1 is a perspective view of the present invention.
Figure 3:
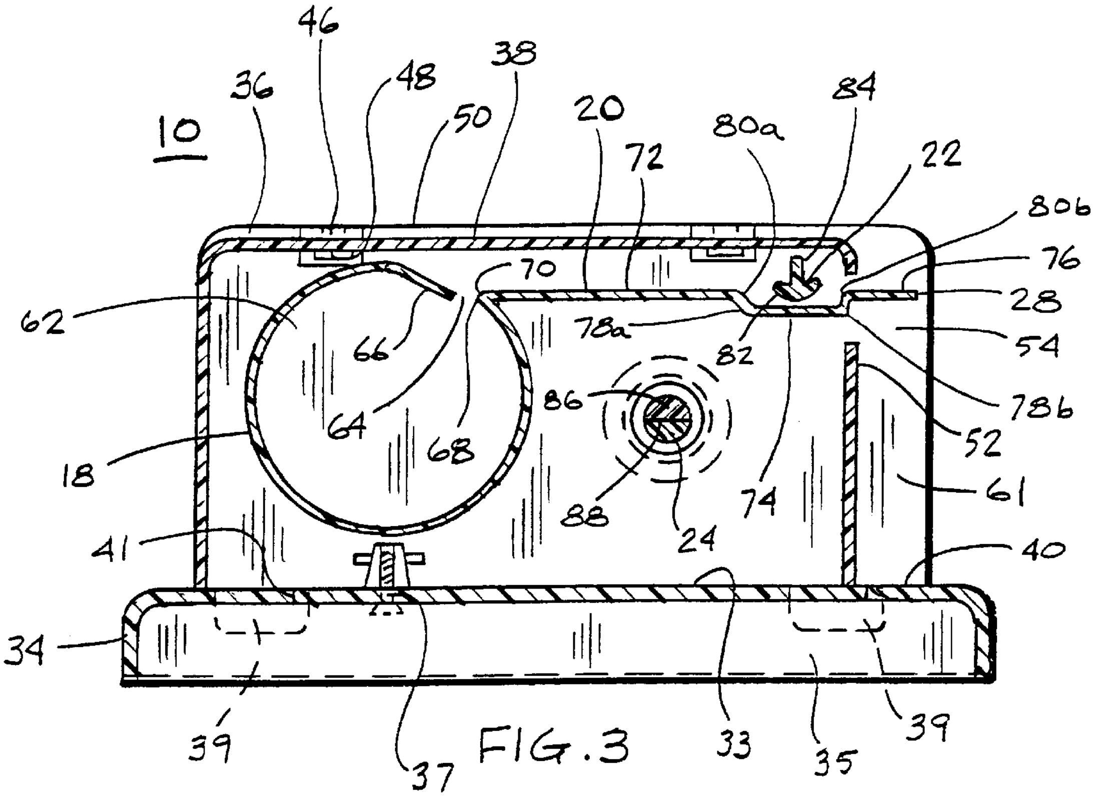
FIG. 3 is a cross-sectional view of the present invention taken substantially along line III—III in FIG. 1.
Figure 5:
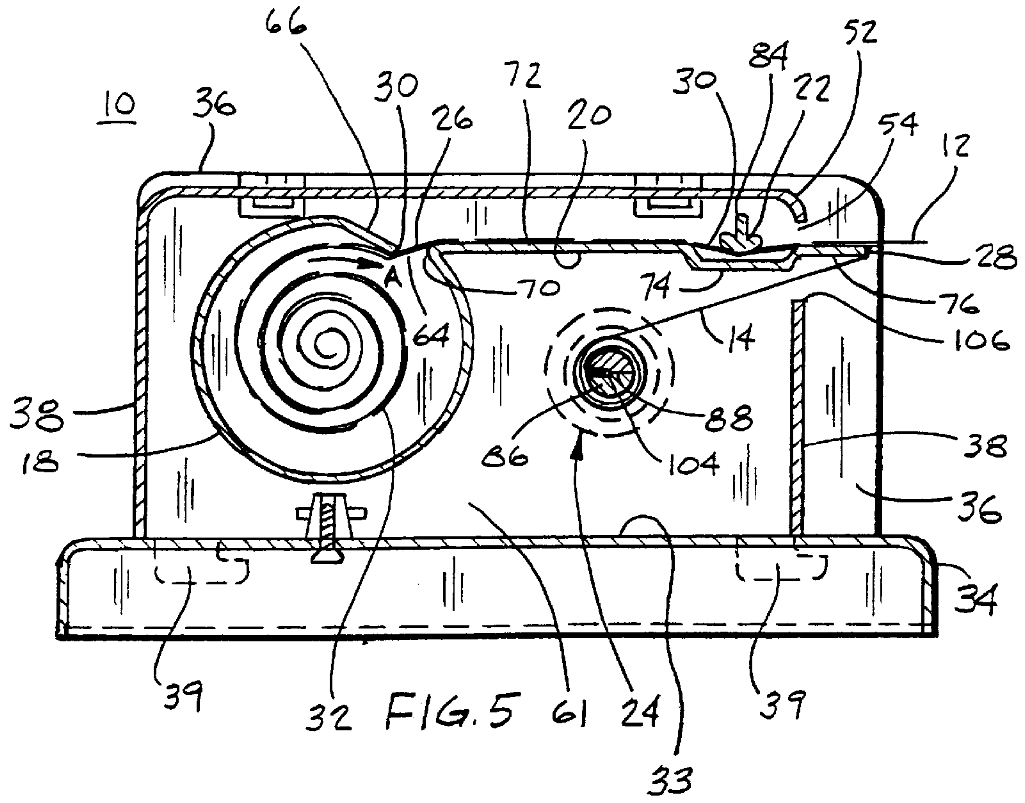
FIG. 5 is the same view as FIG. 3, with a roll of stamps included in the present invention.

Referring now to the drawings and the illustrative embodiments depicted therein, there is shown in FIG. 1 a manual stamp dispenser 10 for dispensing stamps, labels or the like 12. Stamps 12 have a pressure sensitive adhesive backing such that stamps 12 adhere to a backing strip 14 before being dispensed by stamp dispenser 10. Stamp dispenser 10 includes a housing 16 and a base 34. Within housing 16 of stamp dispenser 10, as shown in FIG. 3, is a supply roll holder 18, a guide member 20, a tensioning arm 22 and a take up spool 24. As a knob 25 on an exterior surface 27 of housing 16 is turned, take up spool 24 winds backing strip 14 which pulls a strip of stamps 26 along guide member 20. Guide member 20 guides stamp strip 26 from supply roll holder 18, under tensioning arm 22 and toward a dispensing edge 28 of guide member 20. Backing strip 14 substantially reverses direction as it is pulled around dispensing edge 28, thereby releasing stamps 12 from backing strip 14. As best seen in FIG. 5, while stamps 12 are guided along guide member 20, tensioning arm 22 contacts a surface 30 of stamp strip 26 to provide tension to strip 26, thereby avoiding slack in stamp strip 26 as a supply roll 32 is depleted.

Figure 2:
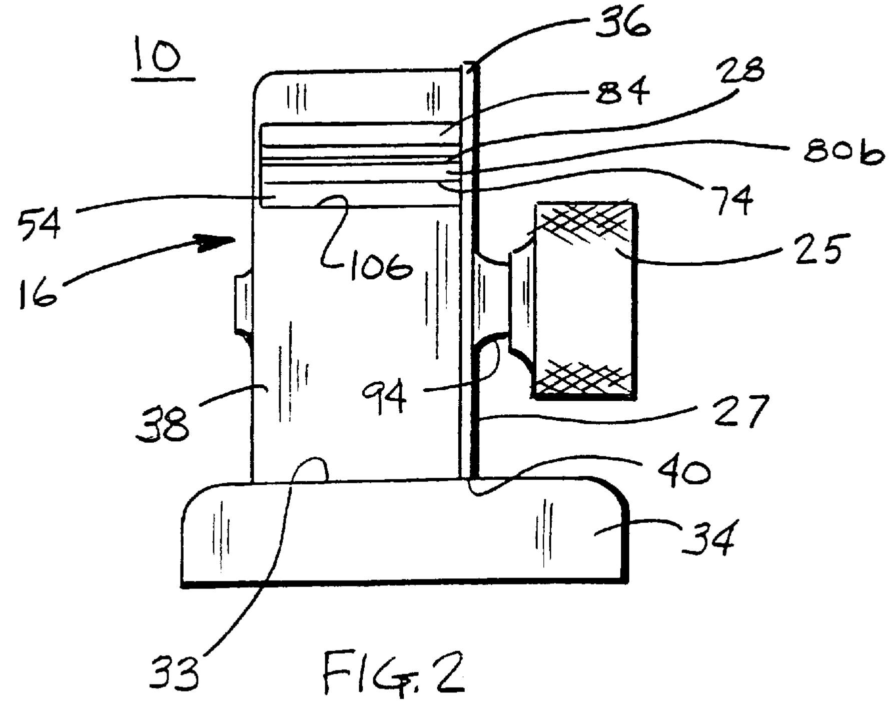
FIG. 2 is an end view of the present invention.

As shown in FIGS. 1 and 3, housing 16 of stamp dispenser 10 is mounted on base 34 and includes a backing plate 36 and a cover 38. Base 34 includes a cavity 35 in which a weight (not shown) may be provided to provide additional stability of stamp dispenser 10 during use. Backing plate 36 is preferably secured along a lower edge 40 to an upper surface 33 of base 34 with a fastener 37 or the like. Backing plate 36 may further include a plurality of tabs 39 along lower edge 40 which insert into corresponding slots 41 along upper surface 33 of base 34 to rigidly secure backing plate 36 to base 34. Alternatively, backing plate 36 may be integrally molded with base 34. As further shown in FIG. 2, knob 25 is rotatably positioned on exterior surface 27 of housing 16, preferably extending outward from backing plate 36.

Cover 38 is preferably removably mounted to both base 34 and backing plate 36 with a plurality of base tabs 42 extending into corresponding slots 44 in upper surface 33 of base 34 and a plurality of backing plate tabs 46 extending into corresponding slots 48 along an upper edge 50 of backing plate 36. Although base 34, backing plate 36 and cover 38 are preferably assembled in a manner which allows for easy assembly and disassembly of housing 16, clearly other attaching means may be implemented without affecting the scope of the present invention. At a dispensing end 52 of cover 38, cover 38 includes a dispensing slot 54 at a location corresponding to dispensing edge 28, such that dispensing edge 28 protrudes through dispensing slot 54, which thereby forms an exit opening and a return opening for stamp strip 26 and backing strip 14, respectively. Cover 38 may further include a view slot 56 extending along a front portion 58 of cover 38 to allow a user of stamp dispenser 10 to easily determine when the supply roll is nearing its end.

As discussed above, housing 16 encases a supply roll holder 18, a guide member 20, a tensioning arm 22 and a take up spool 24, all of which are preferably mounted to backing plate 36 such that each one extends from an interior surface 61 of backing plate 36 into a cavity 60 formed when cover 38 is secured to backing plate 36 and base 34. Most preferably, backing plate 36, supply roll holder 18, guide member 20, and tensioning arm 22 are unitarily formed or molded from a single piece of durable material, such as plastic or the like. However, it should be understood that one or more of the components of tape dispenser 10 may be formed from other materials including metal. As shown in FIG. 3, supply roll holder 18 has a substantially circular wall, extending outward from interior surface 61 of backing plate 36 to form a cylindrical cavity 62 into which a supply roll 32 of stamps may be placed. The depth of cylindrical cavity 62 may vary accordingly with the width of the strips of stamps that will be dispensed by stamp dispenser 10. However, it should be understood that the depth of cylindrical cavity 62 may exceed in width of the backing strip. Supply roll holder 18 includes a slot 64 along the longitudinal axis of cylindrical cavity 62 through which stamp strip 26 may be fed. Supply roll holder 18 may further include a tensioning tab 66, which extends downward and partially across slot 64 to a level substantially similar, and more preferably slightly below that of an upper edge 68 of supply roll holder 18, which bounds the lower end of slot 64. Tensioning tab 66 may be implemented to provide additional tension to stamp strip 26, as discussed below.

Extending between supply roll holder 18 and dispensing edge 28 is guide member 20. Guide member 20 may be formed integrally with supply roll holder 18, such that guide member 20 extends from edge 68 of supply roll holder 18 toward dispensing end 52, providing a smooth transitional edge 70 for stamp strip 26 to slide over as the stamps are unrolled from supply roll holder 18. Guide member 20 may further include a first substantially horizontal flat guide surface 72 of preferably the same width as supply roll holder, a second substantially horizontal flat guide surface or dispensing surface 76 and a lower section 74 which is positioned between the two guide surfaces 72 and 76. Lower section 74 is preferably unitarily formed with the guide surfaces such that each end 78*a* and 78*b* of lower section 74 is connected to guide surface 72 and dispensing surface 76 by a substantially vertical sections 80*a* and 80*b*, respectively, thereby forming a substantially U-shaped section of guide member 20. Dispensing surface 76 is positioned at a level generally corresponding to that of guide surface 72 and extends at least partially through dispensing slot 54 in cover 38. Dispensing surface 76 further includes dispensing edge 28 at one end, which provides a smooth, slightly rounded edge 28 over which backing strip 14 may travel as stamps 12 are released therefrom.

Tensioning arm 22 preferably extends outward from backing plate 36 into cavity 60 and has a smooth curved contact surface 82 on its lower end. As shown in FIG. 3, tensioning arm 22 is positioned above lower section 74 of guide member 20 with contact surface 82 being at a level below that of guide surface 72 and dispensing surface 76 of guide member 20. A stiffening rib 84 is further included along tensioning arm 22 to substantially reduce flexing or bending.

Figure 4:
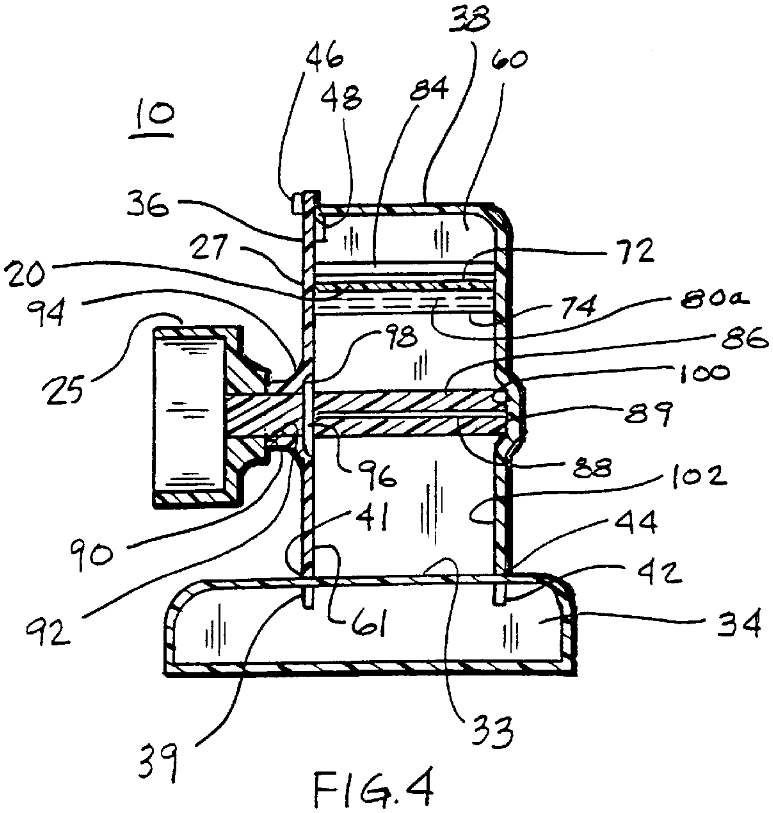
FIG. 4 is a cross-sectional view of the present invention taken substantially along line IV—IV in FIG. 1.

As best shown in FIG. 4, take up spool 24 includes a generally longitudinally elongated pin 86, which is divided by a slot 88 extending longitudinally therealong from backing plate 36 to a free end 89 of pin 86. Knob 25 is secured at an end 90 of pin 86 opposite free end 89, such that pin 86 of take up spool 24 may be turned by a user from outside of housing 16. Take up spool 24 preferably inserts through an aperture 92 in backing plate 36 and extends inward into cavity 60 of housing 16. Backing plate 36 may include a curved surface 94 surrounding aperture 92 to provide clearance between backing plate 36 and knob 25 and to enhance the appearance of stamp dispenser 10. Take up spool 24 is rotatably secured to backing plate 36 by a lock washer 96, which rotates within a recess 98 in interior surface 61 of backing plate 36. Pin 86 is inserted through lock washer 96, which resists longitudinal movement of take up spool 24, while allowing rotation of knob 25 and pin 86. Although a lock washer is described herein, clearly other methods of rotatably securing the take up spool to stamp dispenser 10 may be implemented without affecting the scope of the present invention. The length of elongated pin 86 may be such that take up spool 24 extends outward from backing plate 36 further than supply roll holder 18 and guide member 20. An indentation 100 may be further provided in an interior surface 102 of cover 38 into which cylindrical pin 86 may extend, thereby providing support to free end 89 of pin 86.

Stamp dispenser 10 is preferably molded from a durable plastic material, which allows supply roll holder 18, guide member 20 and tensioning arm 22 to be integrally molded with backing plate 36. Furthermore, stamp dispenser 10 is suitable for setting out on a desk, counter top or the like, as the rounded edges and the substantially enclosed path of the stamp strip provide a finished appearance to stamp dispenser 10. Base 34 provides stability to stamp dispenser 10 such that stamps may easily be advanced and discharged simply by rotating knob 25, without tipping stamp dispenser 10.

Referring now to FIG. 5, a lead end 104 of backing strip 14 is inserted within slot 88 along elongated pin 86, such that as pin 86 is rotated by turning knob 25, backing strip 14 is wrapped around pin 86, which functions to advance stamp strip 26 from supply roll holder 18 through stamp dispenser 10. A lower edge 106 of dispensing slot 56 in cover 38 is positioned a predetermined distance below dispensing surface 76 to provide clearance for backing strip 14 to travel from dispensing edge 28 toward take up spool 24 without contacting cover 38.

Stamp strip 26 originates from a supply roll 32 of stamps which is positioned within supply roll holder 18 such that the roll is unwound in a direction A. As take up spool 24 is rotated, stamp strip 26 is advanced through opening 64 in supply roll holder 18, over transitional edge 70, along guide surface 72, downward and under tensioning arm 22 and upward and onto dispensing surface 76. Stamp strip 26 is pulled to dispensing edge 28, where backing strip 14 is sharply bent or substantially reversed around dispensing edge 28 toward take up spool 24. This acute bending of backing strip 14 causes stamps 12 to be discharged from backing strip 14, as each stamp 12 is of a material substantially more rigid than backing strip 14. Therefore, as backing strip 14 is pulled sharply away from stamps 12, the pressure sensitive adhesive on stamps 12 releases the stamps from backing strip 14. Stamps 12 therefore continue along the direction of dispensing surface 76 rather than bending about dispensing edge 28 with backing strip 14.

As mentioned above, tensioning tab 66 may be provided on supply roll holder 18 to add resistance to movement of stamp strip 26 as stamps are dispensed by stamp dispenser 10. Tensioning tab 66 substantially reduces any potential slack or upward curving of stamp strip 26 over guide surface 72, thereby maintaining tension in stamp strip 26 and causing stamp strip 26 to travel substantially horizontally along guide surface 72. Because supply roll 32 unwinds in direction A and tensioning tab 66 extends across slot 64 and downward to a level substantially similar to and more preferably slightly beneath that of guide surface 72, tensioning tab 66 contacts surface 30 of stamp strip 26 as stamp strip advances through slot 64. The contact between tensioning tab 66 and surface 30 provides resistance to movement of stamp strip 26 as stamp strip 26 must bend upward so as to curve around transitional edge 70 of supply roll holder 18 as stamp strip 26 is advanced through slot 64 in supply holder 18. Therefore, slack in stamp strip 26 is greatly reduced throughout the depletion of supply roll 32, even as the last stamps are pulled through slot 64.

As stamp strip 26 is further pulled along guide surface 72 toward dispensing surface 76, stamp strip 26 may be tensioned by tensioning arm 22. Contact surface 82 of tensioning arm 22 contacts surface 30 of stamp strip 26 such that stamp strip 26 is deflected downward toward lower section 74, between guide surface 72 and dispensing surface 76. Stamp strip 26 is then guided upward onto dispensing surface 76 toward dispensing edge 28 by vertical section **80*b*. The curved surface of contact surface 82 allows stamp strip 26 to contact tensioning arm 22 over a substantial portion of contact surface 82, which provides greater resistance to advancement of stamp strip 26 while providing a smooth, generally constant amount of tension to stamp strip 26. Stiffening rib 84 along tensioning arm 22 further prevents tensioning arm 22 from being deflected upward by stamp strip 26 as stamp strip 26 is tightened along guide member 20, thereby further maintaining a substantially constant amount of tension throughout the supply roll 32. Tensioning arm 22 therefore functions to prevent slack from occurring in stamp strip 26 by providing steady resistance to movement of stamp strip 26, which substantially prevents any slack or upward curvature of stamp strip 26 along guide member 20**.

Therefore, there is disclosed herein a stamp dispenser 10 which provides substantially smooth and constant tension in a strip of stamps or labels as the stamps are dispensed from stamp dispenser 10. By positioning at least one of the two tensioning devices, tensioning tab 66 and tensioning arm 22, at a level different from that of the guide member 20, stamp strip 26 encounters resistance as it is pulled along guide member 20. Most preferably, both tensioning devices are included within stamp dispenser 10 to provide additional resistance, while still allowing easy turning of knob 25 to advance stamp strip 26 through stamp dispenser 10. The resistance generated by the tensioning devices substantially precludes slack from occurring along stamp strip 26 prior to reaching dispensing edge 28, thereby providing tension to stamp strip 26 and allowing every stamp, including the last stamps on the roll, to be discharged properly from stamp dispenser 10. This is a substantial improvement over the prior art in that the present invention reduces slack in stamp strip 26 along guide member 20, which substantially prevents stamps from bending around the dispensing edge with the backing strip. Therefore, the stamps are properly dispensed from stamp dispenser 10 and not wrapped around take up spool 24 along with the backing strip. Furthermore, the present invention provides an appropriate amount of tension to properly dispense the stamps, while avoiding the necessity of additional rollers and guides present in many of the proposed designs.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A stamp dispenser adapted for dispensing stamps, wherein a stamp strip is formed by the stamps being adhered to a backing strip, said stamp dispenser comprising:

a supply holder for holding a supply of stamps therein, said supply holder having a longitudinal exit slot in a wall of said supply holder, said exit slot adapted for the stamp strip to move therethrough;

a dispensing surface for releasing the stamps from the backing strip;

a guide surface for guiding the stamps from said supply holder to said dispensing surface;

a tensioning tab extending partially across said exit slot of said supply holder;

a tensioning arm positioned between said guide surface and said dispensing surface;

a take up spool for advancing the stamp strip, said take up spool being rotatably mounted to said stamp dispenser and adapted for collecting the backing strip after the stamps are released therefrom by said dispensing surface; and a housing, wherein said supply holder, said guide surface, said tensioning tab, and said tensioning arm being encased within said housing.

2. The stamp dispenser of claim 1, wherein said tensioning arm includes a stiffening rib therealong.

3. The stamp dispenser of claim 1, further including a downward depending section between said guide surface and said dispensing surface, said tensioning arm positioned immediately above said downward depending section and protruding downward into a U-shaped section formed by said downward depending section and said guide surface and said dispensing section.

4. The stamp dispenser of claim 1, wherein said tensioning tab is an extension of said supply holder.

5. The stamp dispenser of claim 1 wherein said tensioning tab extends to a first level and said dispensing surface is positioned at a second level such that said first level and said second level are substantially similar.

6. The stamp dispenser of claim 1 wherein said tensioning tab extends to a first level and said dispensing surface is positioned at a second level such that said first level is at a height lower than said second level.

7. The stamp dispenser of claim 1 wherein said guide surface is positioned at a first level and said tensioning tab and said tensioning arm are positioned at a second level, wherein said first level is substantially similar to said second level.

8. The stamp dispenser of claim 1 wherein said guide surface is positioned at a first level and said tensioning tab and said tensioning arm are positioned at a second level, wherein said first level is at a height above said second level.

9. The stamp dispenser of claim 1, wherein said housing includes a backing plate and a cover, said guide surface, said supply holder, said tensioning arm and said tensioning tab being of unitary construction and positioned along said backing plate within said housing, said cover being removably mounted to said backing plate.

10. The stamp dispenser of claim 9, wherein said cover and said backing plate are constructed of a durable plastic material.

11. The stamp dispenser of claim 1 further including a base, wherein said housing being mounted to said base.

12. The stamp dispenser of claim 1, wherein said take up spool further including a collecting pin and a knob such that said knob being positioned on an exterior surface of said housing and said collecting pin being positioned within said housing.

* * * * *